United States Patent
Gupta et al.

(10) Patent No.: US 12,289,600 B2
(45) Date of Patent: *Apr. 29, 2025

(54) ESTABLISHING MULTIPLE SECURITY ASSOCIATIONS IN A CONNECTION OPERATION

(71) Applicant: Arista Networks, Inc., Santa Clara, CA (US)

(72) Inventors: Adhip Gupta, San Jose, CA (US); Rajagopalan Ammanur, Los Altos, CA (US); Sreedhar Ganjikunta, Cupertino, CA (US); Uday Srinivasan, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 17/746,503

(22) Filed: May 17, 2022

(65) Prior Publication Data

US 2022/0279350 A1  Sep. 1, 2022

Related U.S. Application Data

(63) Continuation-in-part of application No. 17/495,705, filed on Oct. 6, 2021, now abandoned, which is a
(Continued)

(51) Int. Cl.
| | |
|---|---|
| *H04W 12/08* | (2021.01) |
| *H04L 9/40* | (2022.01) |
| *H04W 12/0433* | (2021.01) |

(52) U.S. Cl.
CPC ............ *H04W 12/08* (2013.01); *H04L 63/18* (2013.01); *H04L 63/20* (2013.01); *H04W 12/0433* (2021.01)

(58) Field of Classification Search
CPC .. H04W 12/08; H04W 12/0433; H04L 63/18; H04L 63/20; H04L 63/061; H04L 63/164; H04L 63/205
(Continued)

(56) References Cited

U.S. PATENT DOCUMENTS

| | | |
|---|---|---|
| 5,805,705 A | 9/1998 | Gray et al. |
| 6,418,130 B1 | 7/2002 | Cheng et al. |

(Continued)

FOREIGN PATENT DOCUMENTS

WO  WO2008042318 A2  4/2008

OTHER PUBLICATIONS

Cybersecurity & Infrastructure Security Agency. "Securing Network Infrastructure Devices." 6, pages, Jun. 30, 2020.
(Continued)

*Primary Examiner* — Kambiz Zand
*Assistant Examiner* — Aubrey H Wyszynski
(74) *Attorney, Agent, or Firm* — Fountainhead Law Group, PC

(57) ABSTRACT

Disclosed methods and systems employ an agent to identify data paths between first and second networking devices, such that a data path connects an interface of the first networking device with an interface of the second networking device, each interface being uniquely identified by an associated Internet Protocol (IP) address. The agent establishes a secure connection as follows. First a connection is established between the first and second networking devices using respective first and second IP addresses. Next, security keys are negotiated to establish the secure connection, the security keys including encryption keys and decryption keys. Next, inbound and outbound security associations are established for each of the plurality of data paths, inbound and outbound security associations including IP addresses
(Continued)

associated with respective data paths and respective decryption keys. Finally, the inbound and outbound security associations are established in a data plane of the first networking device.

20 Claims, 9 Drawing Sheets

Related U.S. Application Data continuation of application No. 16/667,805, filed on Oct. 29, 2019, now Pat. No. 11,146,959.

(58) Field of Classification Search
USPC .......................................................... 726/4
See application file for complete search history.

(56) References Cited

U.S. PATENT DOCUMENTS

| | | | |
|---|---|---|---|
| 6,643,776 B1* | 11/2003 | Boden | H04L 63/164 |
| | | | 709/224 |
| 6,687,245 B2* | 2/2004 | Fangman | H04L 63/20 |
| | | | 370/356 |
| 7,545,941 B2 | 6/2009 | Sovio et al. | |
| 7,984,494 B2* | 7/2011 | Yoshizawa | H04L 63/164 |
| | | | 726/14 |
| 8,046,820 B2 | 10/2011 | Mcalister | |
| 8,125,939 B2 | 2/2012 | Murasawa et al. | |
| 9,860,273 B2 | 1/2018 | Myron | |
| 10,841,341 B2 | 11/2020 | May | |
| 11,146,959 B2* | 10/2021 | Gupta | H04L 63/0428 |
| 2004/0006618 A1* | 1/2004 | Kasai | H04L 12/4641 |
| | | | 709/223 |
| 2008/0192739 A1 | 8/2008 | Carrasco | |
| 2009/0109933 A1* | 4/2009 | Murasawa | H04L 63/0428 |
| | | | 370/335 |
| 2009/0198996 A1* | 8/2009 | Lie | H04L 63/08 |
| | | | 713/155 |
| 2017/0104787 A1* | 4/2017 | Myron | G06F 8/53 |
| 2021/0281932 A1 | 9/2021 | Chaouch et al. | |
| 2022/0150700 A1 | 5/2022 | Gupta | |

OTHER PUBLICATIONS

International Preliminary Report on Patentability for International Application No. PCT/US2020/057511 mailed May 3, 2022, 7 pages.
International Search Report and Written Opinion for International Application No. PCT/US2020/057511 mailed Feb. 1, 2021, 10 pages.
S.Kent, "IP Encapsulating Security Payload (ESP)", The Internet Society, Dec. 2005, 44 pages.
Extended European Search Report, European Patent Office, Application No. 20881992.0, mailed Sep. 26, 2023.

* cited by examiner

900 →

902

| Inbound SA | Sender address | Destination address | Identifier | Key |
|---|---|---|---|---|
| | IP3 | IP1 | SPI10 | Key10 |
| | IP3 | IP2 | SPI20 | Key20 |
| | IP4 | IP1 | SPI30 | Key30 |
| | IP4 | IP2 | SPI40 | Key40 |
| | Other inbound SAs | | | |

904 →

906

| Outbound SA | Sender address | Destination address | Identifier | Key |
|---|---|---|---|---|
| | IP1 | IP3 | SPI50 | Key50 |
| | IP1 | IP4 | SPI60 | Key60 |
| | IP2 | IP3 | SPI70 | Key70 |
| | IP2 | IP4 | SPI80 | Key80 |
| | Other outbound SAs | | | |

FIG. 9

ESTABLISHING MULTIPLE SECURITY ASSOCIATIONS IN A CONNECTION OPERATION

CROSS REFERENCE TO RELATED APPLICATION

This application is a continuation-in-part of prior application Ser. No. 17/495,705, filed Oct. 6, 2021, which is a continuation of prior application Ser. No. 16/667,805, filed Oct. 29, 2019, now patented as U.S. Pat. No. 11,146,959 which are hereby incorporated by reference in their entirety for all purposes.

BACKGROUND

Enterprise networks may span multiple sites, such as data centers, headquarters, branches, a public cloud, etc. The sites are interconnected using different service providers, such as Internet service providers (ISPs), and may be interconnected via a protocol, such as multi-protocol label switching (MPLS), long term evolution (LTE), the Internet, etc. The traffic sent between the sites may be carried over multiple paths between the sites. For example, between two sites, routers may have multiple links, such as there may be two or more Internet wide area network (WAN) links between the sites. A router in a first site may have two interfaces for two wide area network links and a router in a second site may have two interfaces for the two wide area network links. To provide mesh connectivity between these two sites, there would be four paths between the interfaces of the two routers.

When traffic is carried over the public Internet between the sites, routers may use tunnels, such as Internet Protocol Security (IPsec) tunnels, in which packets are encrypted, encapsulated with an outer header, and then sent over the Internet. For example, the connections offered by the Internet service providers are over a public Internet, and the routers may use IPsec tunnels when traffic is carried over the Internet. For the four paths, the routers create four IPsec connections. To create the IPsec connections, the routers create a connection for each path and negotiate security keys that are used to create a security association for each path. The security association summarizes the security information that is needed to encrypt and decrypt packets for a path. This means that four security associations (SA) with eight security keys are created for the four connections. As a company scales to a large number of sites, such as a large number of branches and data centers, the number of IPsec connections and security keys increases as well. This may increase the management cost of maintaining the security associations and security keys for a large number of IPsec connections in addition to having to establish a large number of connections to negotiate the security keys.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 9 depicts an example of a table that includes the inbound security associations and a table that includes the outbound security associations according to various embodiments.

DETAILED DESCRIPTION

Figure 1:
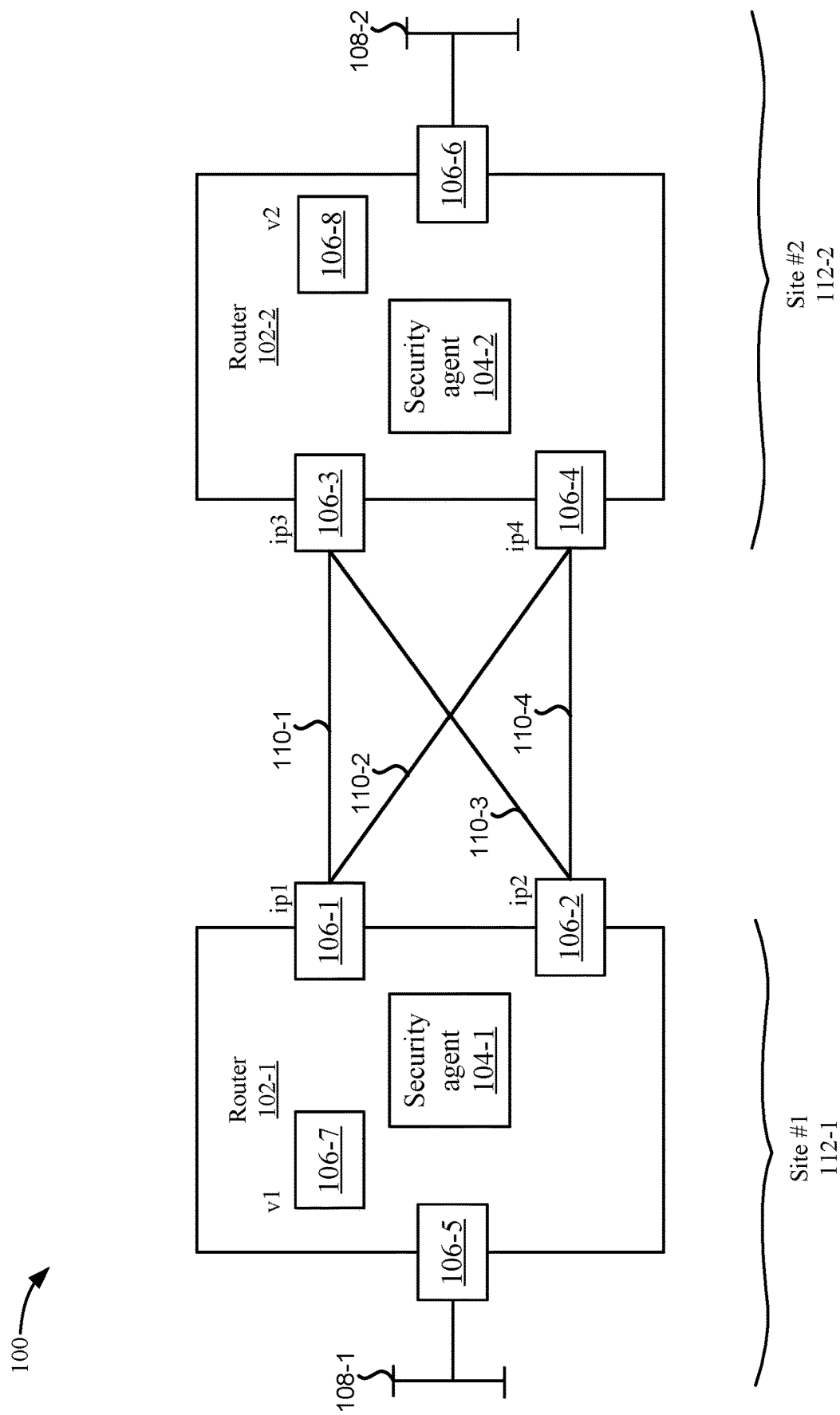
FIG. 1 depicts a simplified system for negotiating security information according to some embodiments.

Described herein are techniques for a router system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments reduce the number of negotiations and security keys that are negotiated between networking devices, such as routers, for paths between sites. For example, an agent in a first router determines the available paths between the first router in a first site and a second router in a second site. To identify the paths, the first router may include interfaces with Internet Protocol (IP) addresses of ip1 and ip2 and the second router includes interfaces with IP addresses of ip3 and ip4. Each interface for a router may connect to a different external network. A full mesh of paths between the first router and the second router may be four paths between the interfaces.

In some embodiments, packets sent in the paths between the first router and the second router should be encrypted. The first router and the second router may establish a connection to negotiate one or more security keys (e.g., encryption and decryption keys). In some embodiments, the negotiation may use a first IP address v1 for the first router and a second IP address v2 for the second router, which may be different IP addresses from IP addresses ip1 to ip4 of the interfaces. The use of different IP addresses may allow the routers to avoid having to perform a renegotiation of the security key when one interface goes down and comes back up. Once completing negotiating the one or more security keys for that particular path/connection associated with IP addresses v1 and v2, the first router and the second router may use the one or more security keys for the multiple paths. Thus, one negotiation was used instead of multiple negotiations (e.g., one negotiation per path for a total of four negotiations). In some embodiments, the first router and the second router may generate a security association per path using the security key. For example, the first router generates four inbound security associations that use an inbound security key and four outbound security associations that use an outbound security key.

The first router uses the four security associations in the four paths in the inbound direction to process incoming packets received from the second router and uses the four security associations in the four paths in the outbound direction to process outgoing packets being sent to the second router. For the four paths, the first router may maintain less than eight keys for the four paths, such as two keys instead of eight keys. Accordingly, one connection is used to negotiate the security keys for multiple paths, which reduces the number of connections needed to negotiate the security keys, and also reduces the number of security keys that are maintained.

System Overview

FIG. 1 depicts a simplified system 100 for negotiating security information according to some embodiments. System 100 includes a first site #1 112-1 and a second site #2 112-2. In some embodiments, the sites may be data centers, branches, headquarters, public clouds, etc. Also, the sites may be associated with a single company in which the company may use security information to encrypt communications between the sites. Although two sites are described, the company may include more than two sites, and each pair of sites may perform the processes described herein. Also, the sites may not be associated with a single company, but communications between the sites use the security information to encrypt communications between the sites.

The sites may include computing devices that communicate between each other. When one computing device in a site communicates with another computing device in another site, networking devices route the data between the sites. For example, a networking device, such as a router 102-1 in site #1 112-1, may communicate with a router 102-2 in site #2 112-2 when data traffic is to be sent in between sites 112-1 and 112-2. Router 102-1 and router 102-2 may be situated on the edge of a network for site #1 112-1 and a network for site #2 112-2, respectively. When data traffic is to be sent in between sites 112-1 and 112-2, router 102-1 and router 102-2 send the data traffic via external networks between each other. A router will be described, but other networking devices may be appreciated.

Router 102-1 may include multiple interfaces to one or more external networks. For example, router 102-1 includes a first interface 106-1 that may interface with a first external network and a second interface 106-2 that may interface with a second external network outside of site #1 112-1. The first external network may be maintained by a first service provider, such as an Internet Service Provider (ISP), and the second external network may be maintained by a second Internet Service Provider. Although two external networks are described, any number of external networks may be used. Also, router 102-1 includes an interface 106-5, such as a physical interface, that interfaces with an internal network 108-1 inside of site #1 112-1. Further, router 102-1 may include an interface 106-7 which may be a logical or physical interface. Interface 106-7 may be used during a negotiation for security information, which will be discussed in more detail below.

Similar to router 102-1, router 102-2 includes a third interface 106-3 and a fourth interface 106-4 that connect to the first and second external networks outside of site #2 112-2. Also, router 102-2 includes an interface 106-6 that connects to an internal network 108-2 inside of site #2 112-2. Further, router 102-2 includes interface 106-8 that may be used in the negotiation for the security information, which will be discussed in more detail below.

Interfaces are associated with addresses, such as IP addresses, that identify the interfaces for routing purposes. For example, interface 106-1 may include an IP address ip1; interface 106-2 includes an IP address of ip2; interface 106-3 includes an IP address of ip3; and interface 106-4 includes an IP address of ip4. Interface 106-7 includes an IP address of v1 and interface 106-8 includes an IP address of v2. In some embodiments, interfaces 106-7 and 106-8 may be loopback interfaces, which may be logical or virtual interfaces that have IP addresses. Interfaces 106-5 and 106-6 may include IP addresses but are not used in the negotiation for security information and are not discussed. As discussed above, the IP address v1 and IP address v2 are IP addresses associated with router 102-1 and router 102-2, respectively. IP addresses v1 and v2 may be associated with interfaces 106-7 and 106-8, respectively, but do not have to be associated with an interface.

Router 102-1 and router 102-2 may route packets in multiple paths between them. Packets may be units of data that are routed between router 102-1 and router 102-2. In some examples, a company may use multiple providers, such as Internet service providers (ISPs), to route packets between router 102-1 and router 102-2. The providers may use different networks, which may result in multiple paths that can be taken between router 102-1 and router 102-2. For example, four paths 110-1, 110-2, 110-3, and 110-4 are shown. These paths may be identified via IP addresses for respective interfaces 106. For example, the following paths are possible:

path1 110-1—ip1→ip3
path2 110-2—ip1→ip4
path3 110-3—ip2→ip3
path4 110-4—ip2→ip4

Router 102-1 and router 102-2 may use security information when sending packets between each other. For example, router 102-1 and router 102-2 may encrypt data using cryptographic information, such as a security key, before sending the data across a public network. That is, router 102-1 may encrypt packets being sent from interface 106-1 to interfaces 106-3 and 106-4 of router 102-2 and from interface 106-2 to interfaces 106-3 and 106-4 of router 102-2. If a packet is being sent from router 102-1 to router 102-2, router 102-1 may encrypt the packet, and send the encrypted packet to router 102-2. Router 102-2 can then use cryptographic information, such as a security key, to decrypt the packet, and can then process the unencrypted data. Router 102-1 may also receive encrypted packets from router 102-1 via the same interfaces and decrypt the packets. Security keys may be shared secret values that are used to perform security services, such as encrypting and decrypting packets. The term security keys will be used for discussion purposes, and this term may include any secret values that may be used to encrypt and decrypt packets.

In some embodiments, router 102-1 and router 102-2 may use a tunneling protocol. For example, router 102-1 may encrypt a packet (e.g., a payload of a packet), and then encapsulate that encrypted packet with an outer header. Then, router 102-1 sends the encapsulated packet to router 102-2. Router 102-2 may then decapsulate the encapsulated packet, and then decrypt the encrypted packet (e.g., the encrypted payload). Tunneling may be used when the source IP address of the packet and the destination IP address of the packet are private IP addresses. For example, a first computing device in site #1 112-1 may send a packet to a second computing device in site #2 112-2. The source IP address and the destination IP address of the outer header may be public addresses for router 102-1 and router 102-2, respectively. For example, the source IP address of the outer header may be IP address ip1 or ip2, and the destination IP address of the outer header may be IP address ip3 or ip4. The use of tunneling does not expose the private IP addresses to the public Internet. Although tunneling is described, some embodiments may be used with or without tunneling.

To determine the security keys that are used to encrypt and decrypt packets, a security agent 104-1 in router 102-1 and a security agent 104-2 in router 102-2 negotiate the security keys. As will be described in more detail below, instead of initiating a negotiation for each path between router 102-1 and router 102-2, security agent 104-1 and security agent 104-2 may initiate a fewer number of connections, such as a single connection, to negotiate a fewer number of security keys than the number of available paths. In some embodiments, security agent 104-1 and security agent 104-2 may negotiate one or more security keys, such as a security key that is used to encrypt packets and a security key that is used to decrypt packets. It is noted that security agent 104-1 and security agent 104-2 may perform the negotiation in different ways. For example, security agent 104-1 and security agent 104-2 may negotiate to generate both the encryption security key and the decryption security key. Also, security agent 104-1 and security agent 104-2 may negotiate to generate a single key that can then be used to generate the encryption security key and the decryption security key. In some embodiments, the security keys are shared between router 102-1 and router 102-2; that is, router 102-1 and router 102-2 use the same security keys. However, security agent 104-1 and security agent 104-2 may negotiate different security keys for both router 102-1 and router 102-2.

After completing negotiating the security keys, security agent 104-1 and security agent 104-2 may generate security associations for the paths between router 102-1 and router 102-2. A security association may summarize security information for a path, such as a source IP address, a destination IP address, a security parameter index (SPI), and a security key. The source IP address may be the IP address for the source of the router sending the packet; the destination IP address is an address for a router that receives the packet; the security parameter index may be an identifier for the security association; and the security key may be the inbound or outbound security key. In some embodiments, security agent 104-1 may generate an outbound key, such as an encryption key, for outbound communications, and an inbound key, such as a decryption key, for inbound communications. Security agent 104-1 uses the outbound key to encrypt packets and uses the inbound key to decrypt packets. The following will now describe the generation of the security association in more detail.

Security Association Generation

Figure 2:
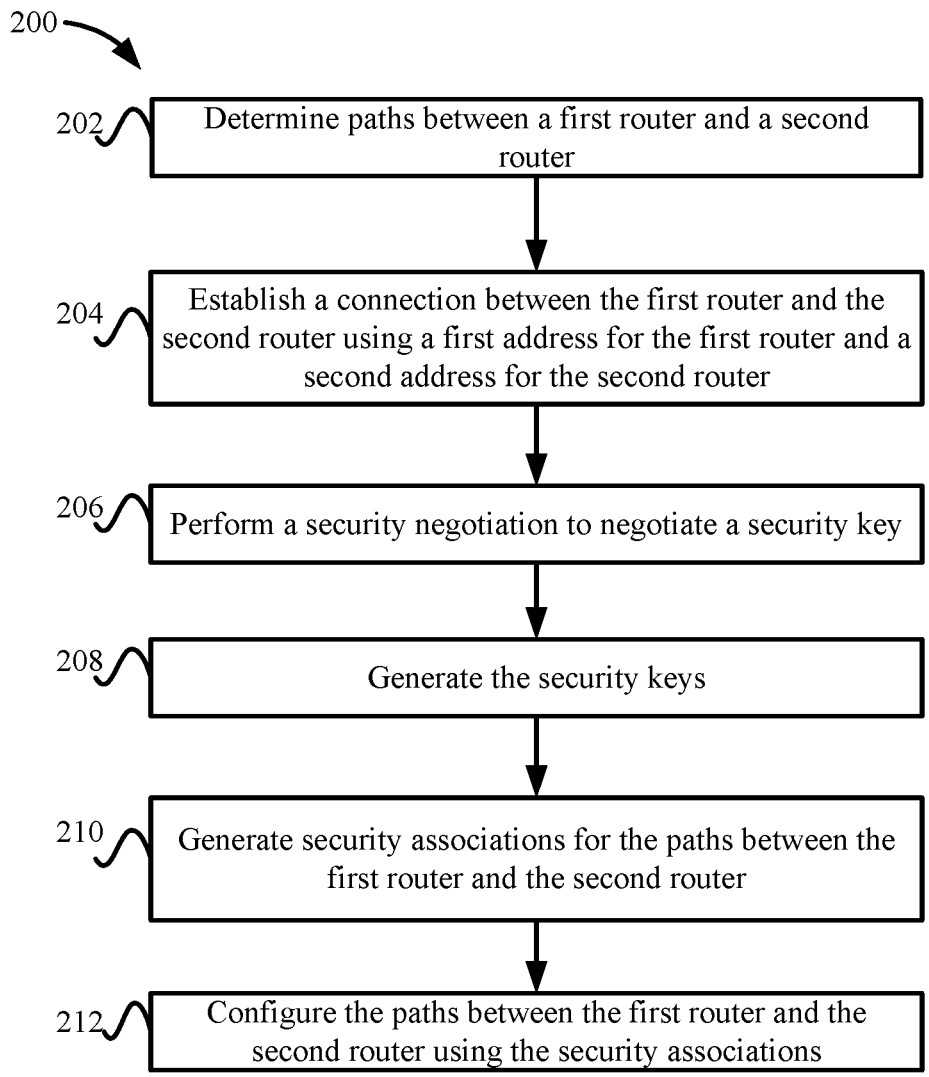
FIG. 2 depicts a simplified flowchart of a method for generating security associations according to some embodiments.

FIG. 2 depicts a simplified flowchart 200 of a method for generating security associations according to some embodiments. The process is described from the perspective of router 102-1, but a similar process may be performed on router 102-2. A configuration setting may determine when the process starts, and which router 102 starts the process. At 202, security agent 104-1 determines paths between router 102-1 and router 102-2. In some embodiments, a mechanism may discover the paths between router 102-1 and router 102-2. In some examples, the mechanism may dynamically determine all remote endpoints for a site. For example, all remote endpoints for router 102-1 may be dynamically determined. In other examples, a static configuration may be used to determine the paths between sites. For example, all remote endpoints for router 102-1 may be statically configured.

In some embodiments, security agent 104-1 in router 102-1 may receive the remote IP addresses for every router and create a set on a per router basis, such as for router 102-1, the set is [router 102-2→(ip3, ip4)]. This set indicates that router 102-2 includes two interfaces with two remote IP addresses. Then, security agent 104-1 may use the associated IP addresses for router 102-1 to generate the paths. For example, from a set of IP addresses ip1 and ip2 for router 102-1, security agent 104-1 creates the paths as a mesh between the interfaces (ip1, ip3), (ip1, ip4), (ip2, ip3), and (ip2, ip4). It is noted that a mesh may not be created. Rather, a number of paths that are less than a full mesh may be used, such as two or three paths in this example.

At 204, security agent 104-1 then establishes a connection between router 102-1 and router 102-2 using a first IP address for router 102-1 and a second IP address for router 102-2. In some embodiments, the process used is an internet key exchange (IKE) process that negotiates the keys. In some embodiments, router 102-1 may use an IP address that is not associated with one of the interfaces being used in the paths between router 102-1 and router 102-2. For example, security agent 104-1 may use IP address v1 for router 102-1 and IP address v2 for router 102-2. One reason for using IP addresses v1 and v2 is that when one the interfaces 106-1 to 106-4 goes down, then a renegotiation of the security keys may not be needed. IP addresses v1 and v2 are not associated with interfaces 106-1 and 106-4. If one of the IP addresses for interfaces 106-1 to 106-4 are used, when one the interfaces 106-1 to 106-4 goes down, then a renegotiation of the security keys will be needed. However, using IP addresses v1 and v2, renegotiation is not needed until all interfaces go down at once. When an interface comes back up, the previously generated security associations are still valid. The use of virtual IP addresses rather than the IP addresses of the paths avoids having to renegotiate security associations for a path that fails or becomes non-operational (e.g., packets cannot be sent on the path) and then comes back up or becomes operational (e.g., packets can be sent on the path).

IP addresses v1 and v2 may be public IP addresses or private IP addresses. If IP addresses v1 and v2 are private IP addresses, then router 102-1 may not use them to route packets between router 102-1 and router 102-2 during the negotiation. If IP addresses v1 and v2 are public IP addresses, router 102-1 can use the public IP addresses to route packets between router 102-1 and router 102-2. The company may receive the public IP addresses from service providers or another entity, such as an Internet Assigned Numbers Authority (IANA). IP addresses v1 and v2 may be used to maintain the connection, but not used in the data plane (e.g., to send packets). The connection is maintained by sending messages using the IP addresses v1 and v2 (e.g., hello messages or pings) that indicate the health or status of the connection, where the connection is maintained as long as there is at least one operational path between the interfaces of the routers 102-1 and 102-2 to transmit the messages.

When IP addresses v1 and v2 are private IP addresses, packets sent in the connection between router 102-1 and router 102-2 may be encapsulated with an outer header using a first tunnel mechanism, which may be different from the tunnel mechanism that is being negotiated. The tunnel mechanism is different than the one being negotiated because the one being negotiated is not established yet and cannot be used to send packets. Different options may be used to tunnel the packets. For example, the packets used to perform the negotiation may be tunneled inside an outer header. The outer IP address header addresses may be public IP addresses for router 102-1 and router 102-2, such as IP addresses ip1, ip2, ip3, and/or ip4, if these addresses are public IP addresses. Another example is to change IP addresses v1 and v2 to public IP addresses of router 102-1 and 102-2 on the sending router 102-1, and then change the public IP addresses to the private IP addresses v1 and v2 on router 102-2 when the packet is received. Logic can be installed at router 102-1 and router 102-2 to change the IP addresses. Using this option, the negotiation may be performed using one connection when IP addresses v1 and v2 are private IP addresses.

Once the connection is established, at 206, security agent 104-1 performs a security negotiation with security agent 104-2 to negotiate the security keys. To perform the security negotiation, security agent 104-1 and security agent 104-2 may exchange packets using IP addresses v1 and v2, and negotiate the content of the security keys. Security agent 104-1 and security agent 104-2 may also negotiate other information that may be used in the security association, such as the security parameter index.

After the negotiation is complete, at 208, security agent 104-1 generates the security keys. In some embodiments, security agent 104-1 may generate an outbound key, such as an encryption key, for outbound communications, and an inbound key, such as a decryption key, for inbound communications. In some embodiments, the inbound key may be used to decrypt inbound communications and the outbound key may be used to encrypt outbound communications. In some embodiments, router 102-1 and router 102-2 may share the inbound key and the outbound key. That is, the encryption key at router 102-1 is the decryption key at router 102-2 and the encryption key at router 102-2 is the decryption key at router 102-1 (e.g., asymmetric). In other embodiments, security agent 104-1 and security agent 104-2 may exchange different keys. Different negotiations may be appreciated to determine the security keys based on a protocol being used to generate the security keys.

After generating the security keys, at 210, security agent 104-1 generates security associations for the paths between router 102-1 and router 102-2. The following will describe generating a security association per path, but enhancements to this process will be described below. Security agent 104-1 may create an inbound security association and an outbound security association using the security keys. The inbound security association may be associated with a first key and the outbound security association may be associated with a second key. For example, the inbound security association (inSA) may be (v1, SPI1, key1), and the outbound security association (outSA) may be (v2, SPI2, key2). In the above, v1 is the IP address of router 102-1 that was used in the negotiation; SPI1 is the security parameter index identifying the inbound security association; and key1 is the security key used to decrypt the inbound packets. For the outbound security association, v2 is the IP address for router 102-2 that was used during the negotiation; SPI2 is the security parameter index identifying the outbound security association; and key2 is the security key used to encrypt the outbound packets.

The above inbound and outbound security associations do not correspond to the four paths between router 102-1 and router 102-2. In some embodiments, security agent 104-1 may use the above inbound security association and outbound security association to generate security associations for each path between router 102-1 and router 102-2. For example, security agent 104-1 may create the following security associations:

inSA: (ip3, ip1, SPI1, key1), (ip3, ip2, SPI1, key1), (ip4, ip1, SPI1, key1), (ip4,ip2, SPI1,key1)

outSA: (ip1, ip3, SPI2, key2), (ip1, ip4, SPI2, key2), (ip2, ip3, SPI2, key2), (ip2, ip4, SPI2, key2).

Further, security agent 104-2 in router 102-2 may create the following security associations for router 102-1:

inSA: (ip1, ip3, SPI1, key1), (ip2, ip3, SPI1, key1), (ip1, ip4, SPI1, key1), (ip2,ip4, SPI1,key1)

outSA: (ip3, ip1, SPI2, key2), (ip4, ip1, SPI2, key2), (ip3, ip2, SPI2, key2), (ip4, ip2, SPI2, key2).

Each security association is denoted in parenthesis. In each security association, the first element is the source IP address, the second element is the destination IP address, the third element is the security parameter index, and the fourth element is the security key. Although eight security associations are described as being generated for the four paths, other enhancements may be used that generate less than one security association per path, which will be described below.

The inbound security association inSA includes four security associations. The first inbound security association is for packets sent from IP address ip3 to IP address ip1. This security association has the identifier of security parameter index SP1 and uses security key key1. The second security association is from IP address ip3 to IP address ip2. The second security association uses the same security parameter index and security key key1 as the first security association. Similarly, the third set of security associations is between IP address ip4 and IP address ip1 and the fourth security association is between IP address ip4 and IP address ip2. The third and fourth security associations also use the same security parameter index SPI1 and security key key1 as the first security association and the second security association. The four security associations include the same security parameter index SPI1 and the same security key key1, and other information required for decrypting a packet.

The outbound security associations represent the four outbound paths of (ip1, ip3), (ip1, ip4), (ip2, ip3), and (ip2, ip4). The four security associations include the same security parameter index SPI2 and the same security key key2, and other information required for encrypting a packet. Accordingly, each security association in the inbound security associations uses the same security parameter index and the same security key, and each security association in the outbound security association similarly uses the same security parameter index and the same security key. Instead of having to negotiate separate security keys for each path, each respective inbound path uses the same security key and each respective outbound path uses the same security key. This reduces the maintenance of the security keys because a security key may be maintained for all the inbound security associations between router 102-1 and router 102-2 and a security key may be maintained for all the outbound security associations between router 102-1 and router 102-2.

Once the security associations are generated, at 212, security agent 104-1 may configure the paths between router 102-1 and router 102-2 using the security associations. For example, security agent 104-1 may install the security associations in the data plane. In some examples, router 102-1 may include an outbound security association table and an inbound security association table that are used by router 102 when processing outbound packets and inbound packets, respectively. Security agent 104-1 may install the security association in the outbound security association table and install the inbound associations in the inbound security association table.

Figure 3:
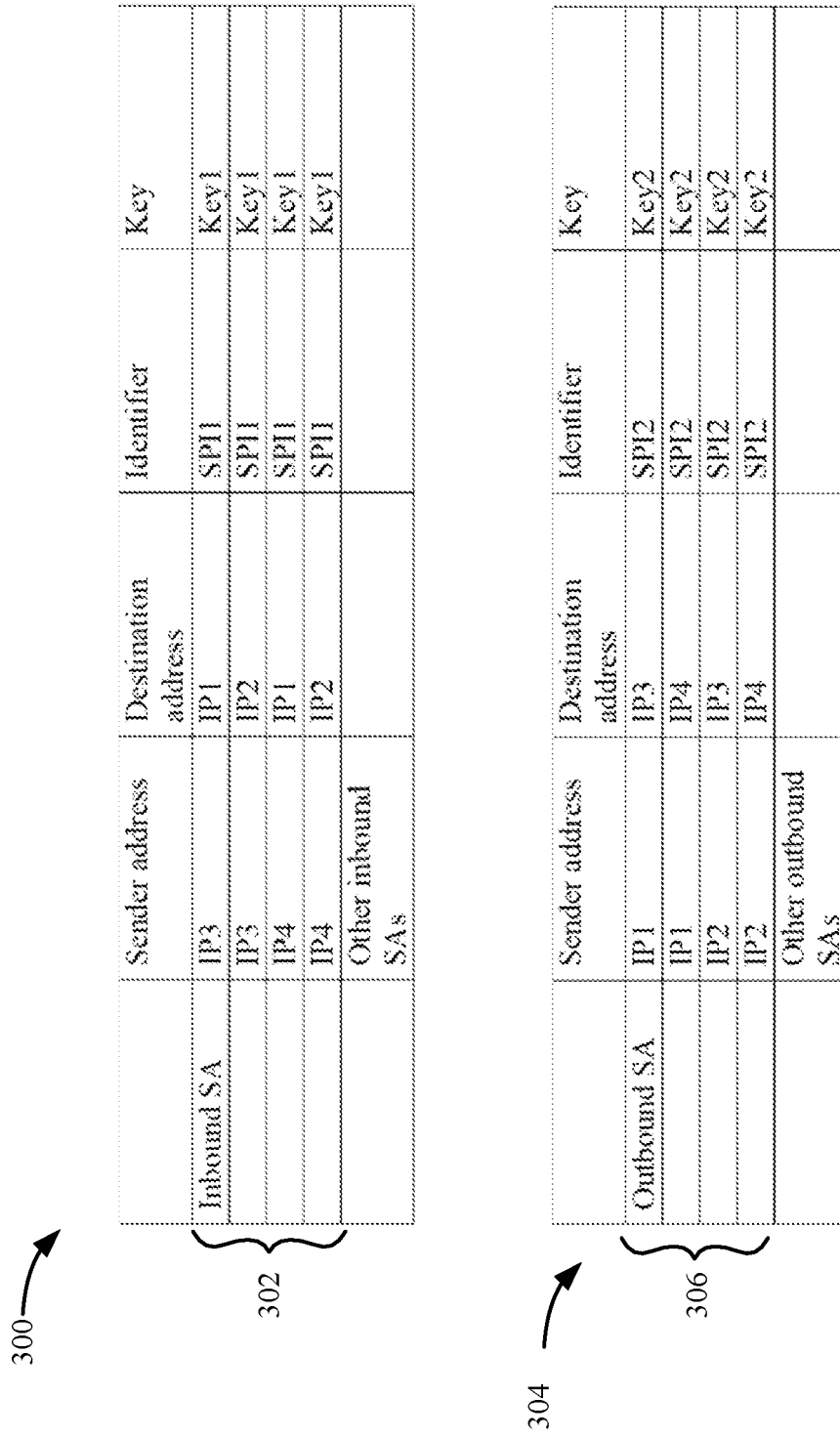
FIG. 3 depicts an example of a table that includes the inbound security associations and a table that includes the outbound security associations according to some embodiments.

FIG. 3 depicts an example of a table 300 that includes the inbound security associations and a table 304 that includes the outbound security associations according to some embodiments. It is noted that the inbound security associations and the outbound security associations may be included in a single table, or the inbound security associations or the outbound security associations may be respectively split into multiple tables.

In table 300, at 302, the inbound security associations for router 102-1 are summarized. Other inbound security associations for receiving packets from other routers may also be included. Each inbound security association lists the sender address, destination address, a security parameter identifier, and a key.

In table 304, at 306, the outbound security associations for router 102-1 are summarized. Other outbound security associations for receiving packets from other routers may also be included. Each outbound security association lists the sender address, destination address, a security parameter identifier, and a key.

The look up of an applicable security association may be based on the parameters found in a packet. For example, router 102-1 uses tuple of the source IP address, destination IP address, security parameter index to look up the security key from table 300 or table 304. The following will describe the use of the security associations in the data path.

Data Path Processing

Figure 4:
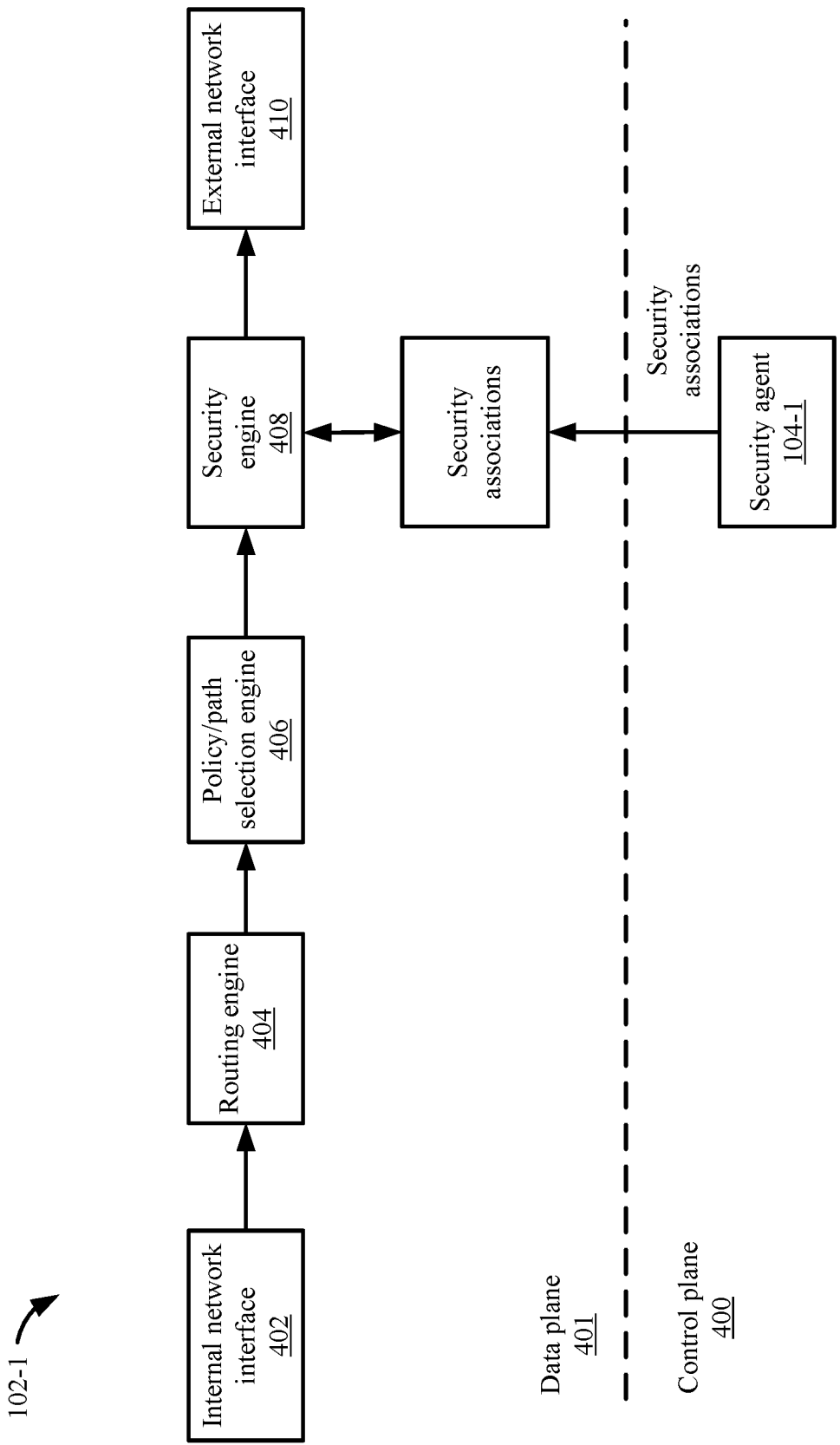
FIG. 4 depicts an example of a control plane and a data plane of a router to process outbound packets according to some embodiments.

FIG. 4 depicts an example of a control plane 400 and a data plane 401 of router 102-1 to process outbound packets according to some embodiments. Only one pair of interfaces is shown, but router 102-1 may include additional interfaces as discussed above. Security agent 104-1 is located in control plane 400, and may generate the security associations as described above. Then, security agent 104-1 installs the security associations in data plane 401, such as in table 300 and table 304.

Data plane 401 can then process packets through a data path. Packet processing may be performed in a chain of packet processing modules, which may be a sequential chain or not sequential. For example, an internal network interface 402, such as an interface to internal network 108-1, in the outbound direction receives a packet for routing. Then, a routing engine 404 may perform routing functions, such as determining layer 3 addresses for routing the packet. Then, a policy/path selection engine 406 determines the path to use. For example, router 102-1 may include multiple paths that can be used to route a packet between router 102-1 and router 102-2. Policy/path selection engine 406 may select one of those paths taking bandwidth, WAN characteristics and different costs to optimize application performance in enterprise deployments.

After selecting the path, a security engine 408 may perform a security service on the packet. For example, the security service may include encrypting the packet. To encrypt the packet, security engine 408 may retrieve the security association for the path from table 304. Security engine 408 may identify the source IP address and the destination IP address for the packet. For example, if the path between interface 106-1 and interface 106-3 is being used, then IP address ip1 and IP address ip3 are used to look up the outbound security association. Security engine 408 may also determine the security parameter index for the packet. Security engine 408 includes the security parameter index in the packet after encryption and encapsulation. The security parameter index may be set based on different methods. Security engine 408 retrieves the security association from table 304 using the IP addresses for the interfaces that are being used and the security parameter index. For example, if the path to route the packet is from interface 106-1 to interface 106-3 from IP address ip1 to IP address ip3, then security engine 408 retrieves the security association for (ip1, ip3, SPI2, key2). The security association includes the security key, which is security key key2. Then, security engine 408 uses the security key key2 to encrypt the packet.

After encrypting the packet, other services may also be performed, such as encapsulating the packet with an outer header. Then, an external network interface 410 to an external network sends the packet to router 102-2 using the selected path.

Figure 5:
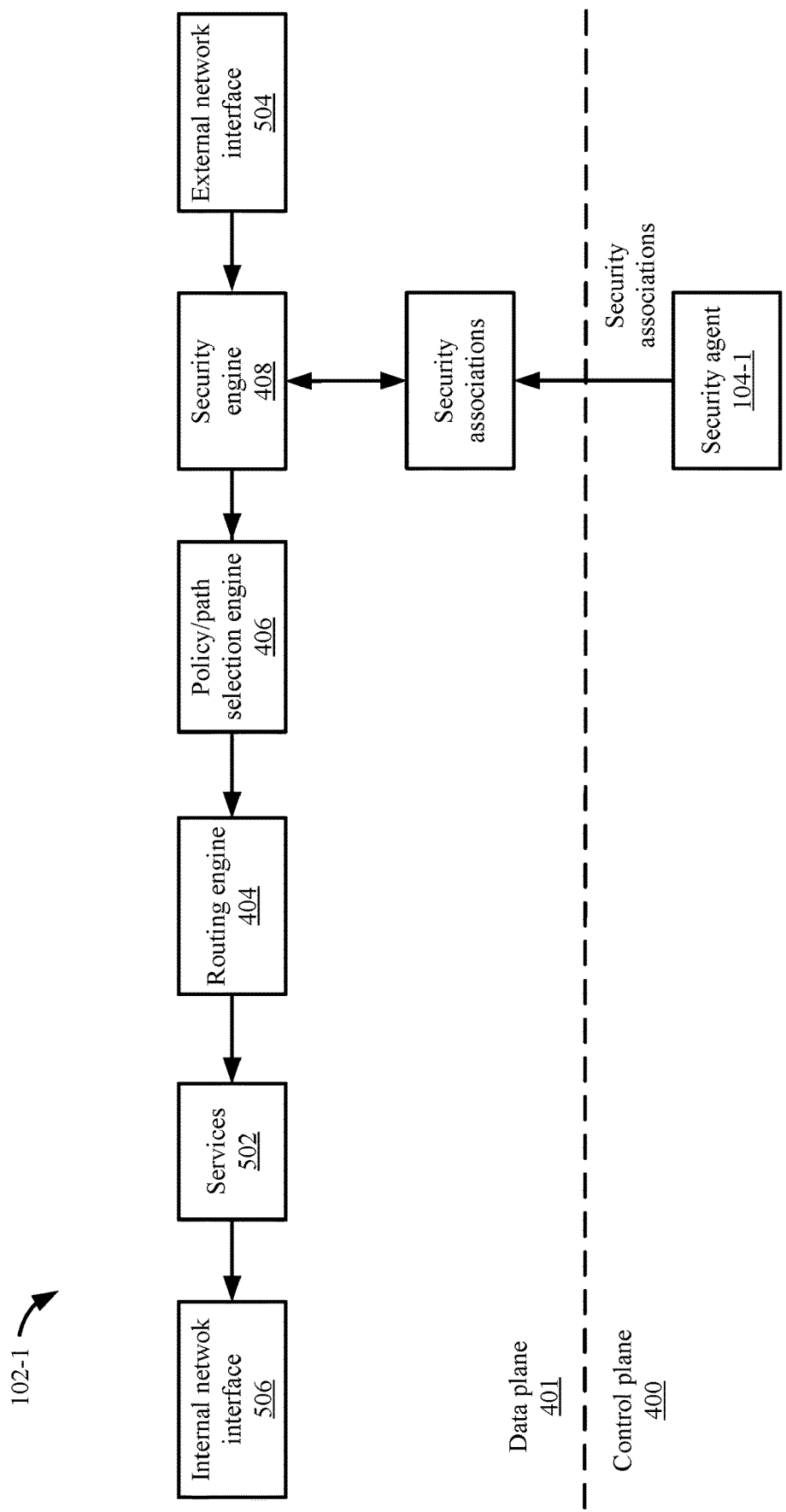
FIG. 5 depicts an example of control plane and data plane of the router to process inbound packets according to some embodiments.

FIG. 5 depicts an example of control plane 400 and data plane 401 of router 102-1 to process inbound packets according to some embodiments. Only one pair of interfaces is shown, but router 102-1 may include additional interfaces as discussed above. An external network interface 504 in the inbound direction receives a packet from router 102-2. The packet may be decapsulated if the packet was sent through a tunnel. Security engine 408 then retrieves the destination IP address, the sender address, and the security parameter index from the packet. Security engine 408 can then select the security association from table 300. The key for the security association is then used by security engine 408 to decrypt the payload of the packet. For example, if the packet is received at interface 106-2 using IP address ip2 from interface 106-3 with IP address ip3 in router 102-2, with the security parameter index SPI1, then security engine 408 retrieves the security association for (ip2, ip3, SPI2, key2).

Then, policy/path selection engine 406 determines the path to use in internal network 108-1. Routing engine 404 may perform routing functions, such as determining layer 3 addresses for routing the packet.

Other services 502 may then be performed on the unencrypted packet. Thereafter, the decrypted packet is sent on internal network interface 506 in the inbound direction for routing within network 108-1.

Figure 6:
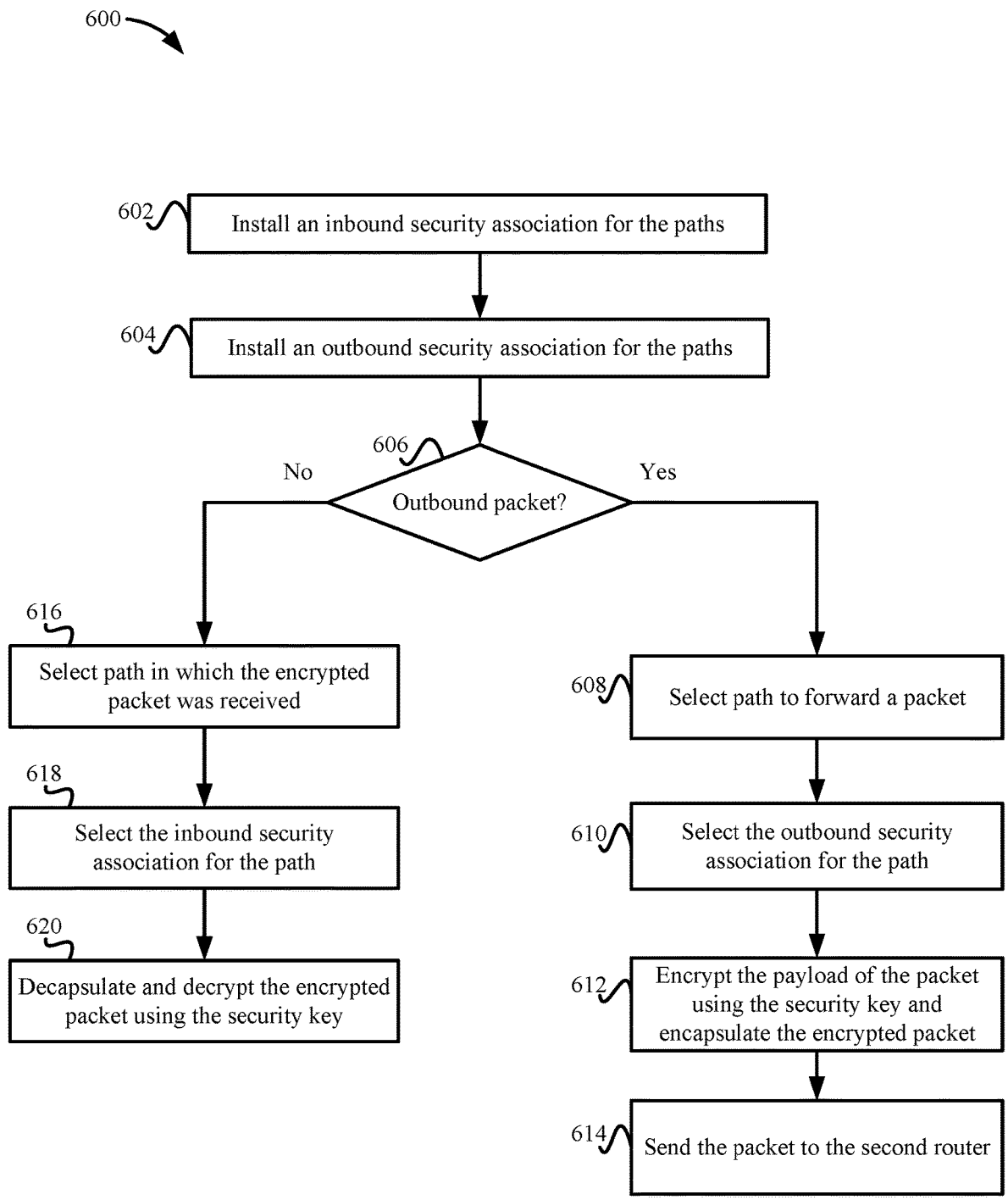
FIG. 6 depicts a simplified flowchart of a method for processing inbound and outbound packets according to some embodiments.

FIG. 6 depicts a simplified flowchart 600 of a method for processing inbound and outbound packets according to some embodiments. At 602, security agent 104-1 installs an inbound security association for the paths. Also, at 604, security agent 104-1 installs an outbound security association for the paths.

At 606, router 102-1 determines if an inbound packet is being received or an outbound packet is being sent. If an outbound packet is being sent, at 608, router 102-1 selects a path to forward the packet. Then, at 610, router 102-1 selects an outbound security association for the path. At 612, router 102-1 encrypts the payload of the packet using the security key and encapsulates the encrypted packet with an outer header. Then, at 614, router 102-1 sends the packet to router 102-2.

If an inbound packet is being processed, at 616, selects a path in which the encrypted packet was received. At 618, router 102-1 selects the inbound security association for the path. At 620, router 102-1 decapsulates the packet to remove the outer header to determine the encrypted packet and decrypts the encrypted packet using the security key.

Other Embodiments for Security Association Installation

In some embodiments, as described above, if four paths are located between router 102-1 and router 102-2, then security agent 104-1 installs four inbound security associations and four outbound security associations for the four paths. However, other methods for generating the security associations may be performed. In some embodiments, instead of installing four outbound security associations and four inbound security associations, security agent 104-1 may install a fewer number of security associations, such as one outbound security association and two inbound security associations for the four paths.

The outbound security association may include the security parameter index and security key key2. Security agent 104 may install the outbound security association in table 304 with a handle that can uniquely identify the path. For example, a Security Association handle (saHandle) may be a value that uniquely identifies a given connection and its security association in a table. In some embodiments, the Security Association Handle (saHandle) is provided to policy/path selection engine 406, which decides the path that the packet is to use and adds the Security Association Handle (saHandle) to metadata of the packet if the packet needs to be encrypted or not. The metadata is set such that an additional module in the chain of data plane 401 can use the metadata to perform services fast and efficiently for the packet. In some embodiments, the metadata is not part of the actual packet that is transmitted from router 102-1. When policy/path selection engine 406 selects the path in which to send the packet, policy/path selection engine 406 determines the Security Association Handle (saHandle) for that path. When the packet reaches security engine 408, security engine 408 may retrieve the Security Association Handle (saHandle) from the metadata and then retrieve the outbound security association associated with that Security Association Handle (saHandle).

Figure 7:
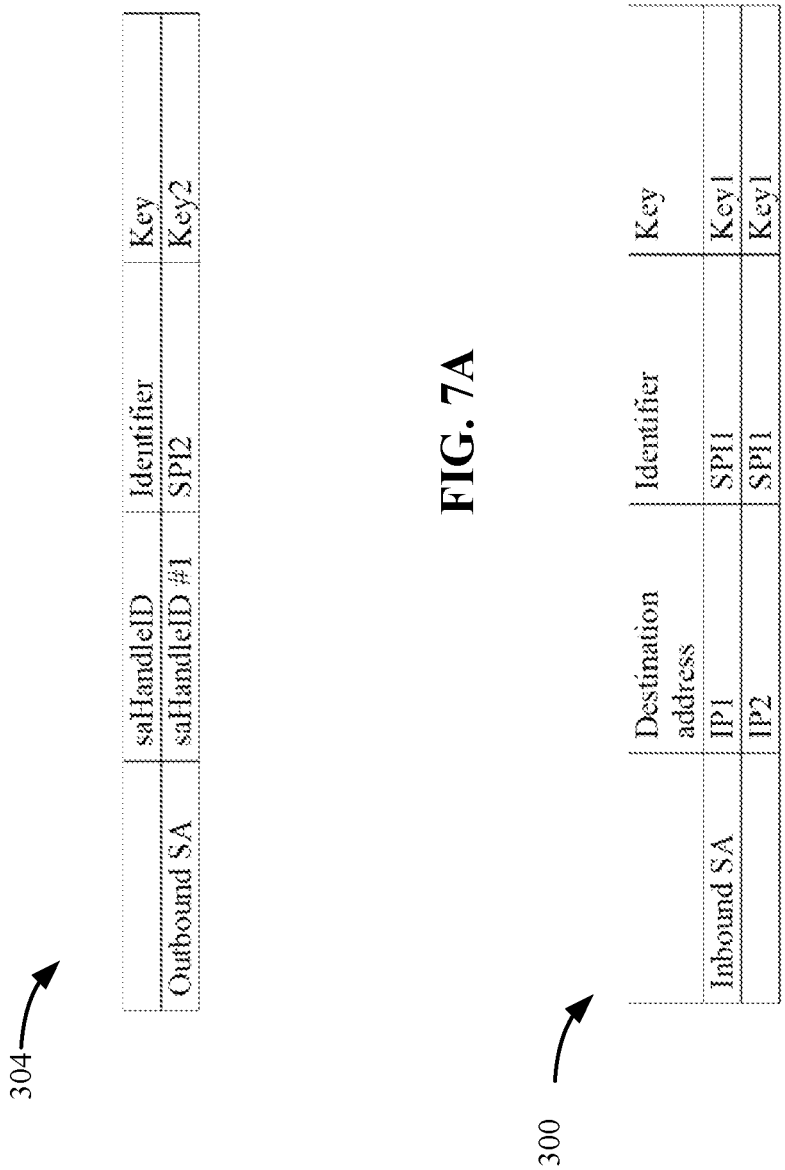
FIG. 7A depicts an example of a table for outbound security associations according to some embodiments.
FIG. 7B depicts an example of a table for inbound security associations according to some embodiments.

FIG. 7A depicts an example of table 304 for outbound security associations according to some embodiments. The saHandle #1 may be used to identify the four paths that may be used between router 102-1 and router 102-2. That is, saHandle #1 is inserted in metadata for packets being sent using any of the four paths. When security engine 408 uses the saHandle #1 to look up the security association, table 304 returns the security key key2 and the security parameter index SPI2.

On the decryption side, security agent 104 may install two inbound security associations in data plane 401. One inbound security association may be for interface 106-1 and one security association may be for interface 106-2. For example, the two inbound security associations are (ip1, SPI1, key1) and (ip2, SPI1, key1). In this example, the sender IP address is not specified in the inbound security associations. When a packet arrives at router 102 for decryption, the packet's destination IP address would be one of the IP addresses of router 102-1, which will be IP address ip1 or IP address ip2. Security engine 408 uses the destination IP address in the header of the packet and the security parameter index in the header of the packet to retrieve the corresponding inbound security association.

FIG. 7B depicts an example of a table 300 for inbound security associations according to some embodiments. The destination address ip1 may be used to identify the two paths that use interface 106-1 and the destination address ip2 may be used to identify the two paths that use interface 106-2. That is, when a packet is received on interface 106-1, the packet includes the destination address of ip1. When security engine 408 uses the destination address of ip1 to look up the security association, table 300 returns the security key key1 and the security parameter index SPI1. Similarly, when a packet is received on interface 106-2, the packet includes the destination address of ip2. When security engine 408 uses the destination address of ip2 to look up the security association, table 300 returns the security key key1 and the security parameter index SPI1.

Replay Window

Router 102-2 uses an anti-replay window to deny replay attacks. For example, if any packets that have been previously sent are spoofed and sent again, the replay window process checks the sequence number of the packet and its replay window to identify if the packet has already been decrypted and processed. Router 102-1 may determine the sequence numbers differently. For example, router 102-1 may use the same replay window and sequence numbers for each security parameter index. Router 102-1 updates received sequence numbers in a first replay window for packets received on any of the paths between router 102-1 and router 102-2. All the inbound paths are identified by security parameter index SPI1 in this case. Also, router 102-1 updates sequence numbers in a second replay window for packets sent on any of the paths between router 102-1 and router 102-2. All the outbound paths are identified by security parameter index SPI2 in this case. Also, the first replay window and the second replay window may be set at a value in which legitimate packets are not dropped due to the replay window limit even though there is no replay attack in progress. In some embodiments, extended sequence numbers (ESN) may be used to allow the sequence numbers to become large numbers so that in high throughput networks, the sequence numbers take a much longer time to recycle.

Also, router 102-1 may use a separate replay window and sequence number space for each interface. For example, the security associations for the destination address ip1 and security parameter index SPI1 (ip1, SPI1) would have a separate replay window and sequence numbers compared to the security associations for the destination address ip2 and security parameter index SPI1 (ip2, SPI1). That is, the replay window may be identified per destination IP address and SPI. Further differentiations may be made per path. That is, the sequence numbers may be incremented per path and router 102-1 keeps a separate replay window for each path, such as the four paths between router 102-1 and router 102-2 may have a separate replay window and separate sequence numbers.

Re-Key

A re-key process is when a new negotiation is performed between router 102-1 and router 102-2 to generate a new key. The re-key process is used to regenerate Security keys after a certain amount of time has elapsed or a certain amount of data has been transferred. The initial negotiation may have been between a single IP address for each router 102-1 and 102-2, such as for IP address v1 and IP address v2. When the same key and security parameter index are used for all inbound connections and outbound connections, respectively, router 102-1 and router 102-2 may perform a single re-key process.

The re-keying may be performed based on different factors. For example, when a cumulative number of packets that are encrypted and decrypted by all security associations associated with router 102-2. That is, router 102-1 may count the number of packets encrypted or decrypted from the packets sent from router 102-1 to router 102-2 or the packets received from router 102-2 at router 102-1. When the cumulative number reaches a threshold, router 102-1 and router 102-2 perform a re-key negotiation to generate a new security key. It may be possible that some of the paths may not have processed enough packets to reach the threshold, but these paths will still get a new security key and security parameter index when the re-key occurs. For example, if one outbound security association is associated with most of the traffic between router 102-1 and router 102-2, the re-key may still be performed for all the security associations. One advantage of this is that only a single re-key is performed per router pair instead of for each underlying path.

In other embodiments, router 102-1 may keep track of the number of packets encrypted and decrypted for each path. When one of the paths reaches the re-key threshold, then router 102-1 may perform a negotiation. However, the other paths may not have reached the threshold to cause a re-key due to at least one path is processing most of the packets sent between router 102-1 and router 102-2. As above, all the paths may receive a new security key and security parameter index.

CONCLUSION

Accordingly, inbound and outbound packets may be processed using inbound security associations and outbound security associations. The generation of the inbound security associations and outbound security associations may have been performed using a single negotiation. This reduces the number of negotiations needed and also reduces the number of keys that need to be maintained. Also, using virtual IP addresses to perform the IKE negotiation allows an interface in the connection to go down and not require renegotiation of the keys when the interface comes back up. The previously negotiated keys can still be used for the interface.

EMBODIMENTS

In some embodiments, a method to establish a secure connection between networking devices, the method comprising: identifying, by an agent of a first networking device, a plurality of data paths between the first networking device and a second networking device, wherein a given data path connects an interface of the first device with an interface of the second networking device, each interface being uniquely identified by an associated Internet Protocol (IP) address; establishing, by the agent, a secure connection, wherein establishing the secure connection includes: establishing a connection between the first and second networking devices using a first virtual IP address of the first networking device and a second virtual IP address of the second networking device; negotiating one or more security keys to establish the secure connection, the one or more security keys including at least an encryption key and a decryption key; generating an inbound security association and an outbound security association for each of the plurality of data paths, a given inbound security association including IP addresses associated with the given data path and the decryption key, a given outbound security association including IP addresses associated with the given data path and the encryption key; and installing the inbound security association and outbound security association of each of the plurality of data paths in a data plane of the first networking device.

In some embodiments, a given inbound security association decrypts one or more packets that are received by the first networking device from the second networking device in a given path, wherein a given outbound security association encrypts one or more packets that are sent by the first networking device to the second networking device in the given path.

In some embodiments, each of the plurality of data paths use the inbound security association and the outbound security association.

In some embodiments, when one of the plurality of data paths becomes unoperational, renegotiation of the one or more security keys is not needed when the one of the plurality of data paths is operational.

In some embodiments, a method comprising: receiving, by a computing device, address information for two or more paths between a first networking device and a second networking device; establishing, by the computing device, a connection between the first networking device and the second networking device to determine one or more security keys for the first networking device and the second networking device; and installing, by the computing device, the one or more security keys with the address information for the two or more paths, wherein the one or more security keys are used to provide a security service on one or more packets that are sent or received between the first networking device and the second networking device using the address information for the two or more paths.

In some embodiments, receiving the address information for two or more paths between the first networking device and the second networking device comprises: receiving a first set of addresses for a first set of interfaces on the first networking device and a second set of addresses for a second set of interfaces on the second networking device; and generating the two or more paths based on connections between the first set of addresses for the first set of interfaces and the second set of addresses for the second set of interfaces.

In some embodiments, when one of the two or more paths becomes unoperational, renegotiation of the one or more security keys is not needed when one of the two or more paths is operational.

In some embodiments, the two or more paths are between a first set of addresses for the first networking device and a second set of addresses for the second networking device, and a third set of addresses that are not part of the two or more paths are used to determine the one or more security keys.

In some embodiments, when determining one or more new security keys, using the third set of addresses to determine the one or more new security keys for the first networking device and the second networking device.

In some embodiments, the third set of addresses are private addresses, the third set of addresses are changed to a fourth set of addresses, wherein the fourth set of addresses are used to establish the connection, and the second networking device converts the fourth set of addresses to the third set of addresses to determine one or more security keys for the first networking device and the second networking device.

In some embodiments, the first set of addresses are interfaces on the first networking device that are used to send or receive a packet in the one or more packets in the two or more paths, the second set of addresses are interfaces on the second networking device that are used to send or receive a packet in the one or more packets in the two or more paths, and the third set of addresses are interfaces for the first networking device and the second networking device that are not used to send or receive a packet in the one or more packets in the two or more paths.

In some embodiments, installing the one or more security keys with the address information for the two or more paths comprises: generating first security information for an outbound direction using the one or more security keys, and generating second security information for an inbound direction using the one or more security keys.

In some embodiments, the one or more security keys comprises a first security key for encrypting the one or more packets and a second security key for decrypting the one or more packets, generating the first security information comprises:

generating one or more first inbound security associations for a first path using the first security key, and generating one or more second inbound security associations for a second path using the first security key, and generating the second security information comprises: generating one or more first outbound security associations for the first path using the second security key, and generating one or more second outbound security associations for the second path using the second security key.

In some embodiments, the one or more first inbound security associations comprise a first address for the first networking device, a third address for the second networking device, and the first security key, the one or more first outbound security associations comprise the first address for the first networking device, the third address for the second networking device, and the second security key, the one or more second inbound security associations comprise a second address for the first networking device, a fourth address for the second networking device, and the first security key, and the one or more second outbound security associations comprise the second address for the first networking device, the fourth address for the second networking device, and the second security key.

In some embodiments, the first address is for a first interface for the first networking device and the second address is for a second interface for the first networking device, and the third address is for a third interface for the second networking device and the fourth address is for a fourth interface for the second networking device, wherein the first interface, the second interface, the third interface, and the fourth interface are used to communicate the one or more packets in the two or more paths.

In some embodiments, the one or more security keys comprises a first security key for encrypting the one or more packets and a second security key for decrypting the one or more packets, generating the first security information comprises:

generating first inbound security information for a first path using the first security key, and generating second inbound security information for a second path using the first security key, and generating the second security information comprises:

generating outbound security information for the first path and the second path using the second security key.

In some embodiments, establishing the connection between the first networking device and the second networking device to determine the one or more security keys for the first networking device and the second networking device comprises: using virtual addresses for the first networking device and the second networking device that are not used in a data plane to route packets in the two or more paths.

In some embodiments, renegotiation of the one or more security keys are not needed when a path in the two or more paths becomes non-operational and come back to be operational when the virtual addresses are used to negotiate the one or more security keys.

In some embodiments, the method further comprising: counting a number of packets sent on the two or more paths, and upon determining that one or more new security keys are required based on the number of packets, establishing another connection between the first networking device and the second networking device to determine the one or more new security keys for the first networking device and the second networking device.

In some embodiments, the method further comprising: maintaining a replay window for the two or more paths, and incrementing sequence numbers for packets sent on the two or more paths.

In some embodiments, a non-transitory computer-readable storage medium having stored thereon computer executable instructions, which when executed by a first networking device, cause the first networking device to be operable for: receiving address information for two or more paths between the first networking device and a second networking device; establishing a connection between the first networking device and the second networking device to determine one or more security keys for the first networking device and the second networking device; and installing, the one or more security keys with the address information for the two or more paths, wherein the one or more security keys are used to provide a security service on one or more packets that are sent or received between the first networking device and the second networking device using the address information for the two or more paths.

System

Figure 8:
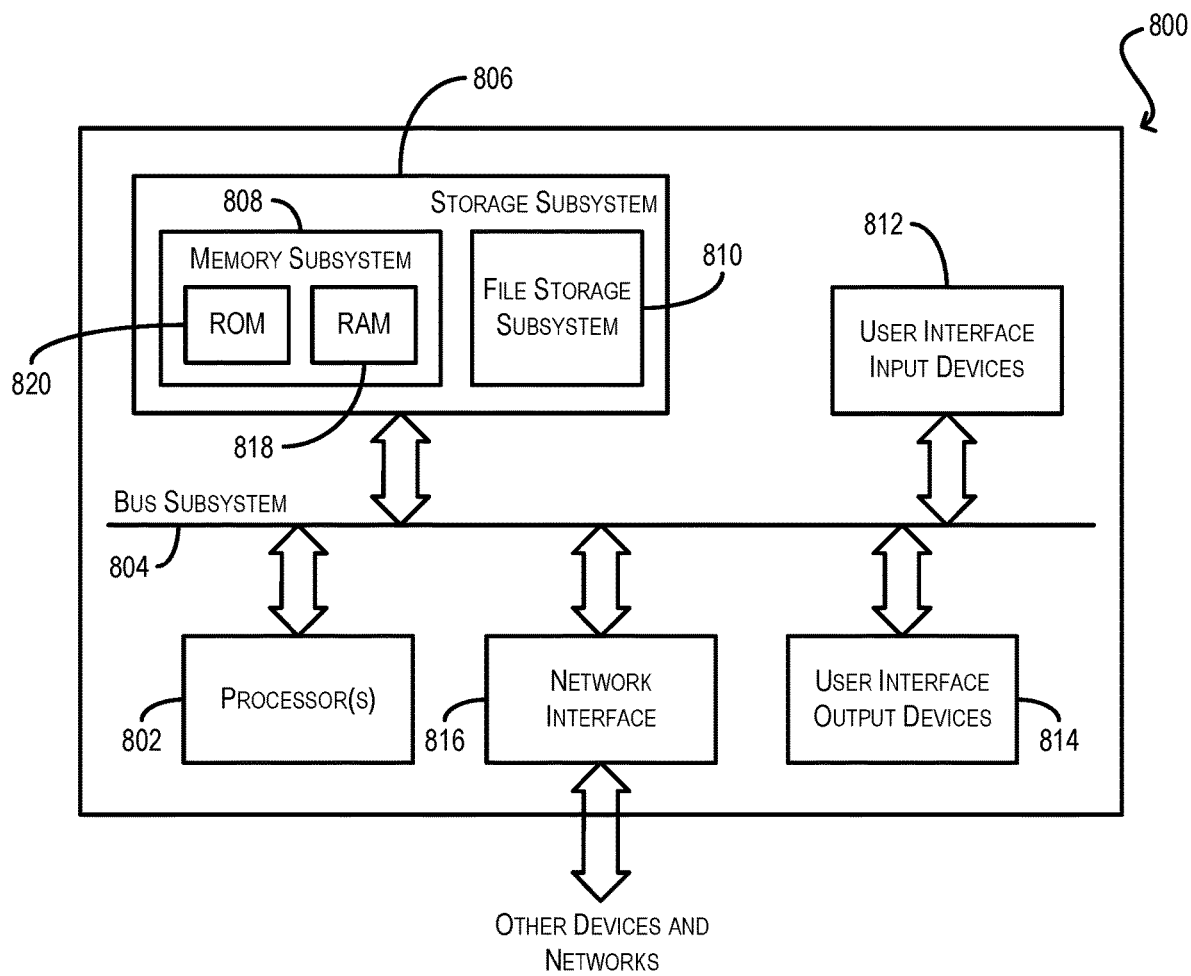
FIG. 8 depicts an example computer system according to some embodiments.

FIG. 8 depicts an example computer system 800 according to some embodiments. Computer system 800 can be used to implement any of the computing devices, systems, or servers described in the foregoing disclosure. As shown in FIG. 8, computer system 800 includes one or more processors 802 that are communicatively coupled to and communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

Security Association Generation

Referring back to FIG. 2, security agent 104-1 at 210 may generate security associations for the paths between router 102-1 and router 102-2 (FIG. 1). Inbound and outbound security associations may correspond to the four paths between router 102-1 and router 102-2, in accordance with various embodiments. Security agent 104-1 may use the inbound security association and outbound security association to generate security associations for each path between router 102-1 and router 102-2. For example, security agent 104-1 may create the following security associations:

inSA: (ip3, ip1, SPI10, key10), (ip3, ip2, SPI20, key20), (ip4, ip1, SPI30, key30), (ip4, ip2, SPI40, key40)

outSA: (ip1, ip3, SPI50, key50), (ip1, ip4, SPI60, key60), (ip2, ip3, SPI70, key70), (ip2, ip4, SPI80, key80)

The above security associations are illustrated in FIG. 9. Further, security agent 104-2 in router 102-2 may create the following security associations for router 102-1:

inSA: (ip1, ip3, SPI10, key10), (ip2, ip3, SPI20, key20), (ip1, ip4, SPI30, key30), (ip2, ip4, SPI40,key40)

outSA: (ip3, ip1, SPI50, key50), (ip4, ip1, SPI60, key60), (ip3, ip2, SPI70, key70), (ip4, ip2, SPI80, key80)

Each security association is denoted in parenthesis. In each security association, the first element is the source IP address, the second element is the destination IP address, the third element is the security parameter index, and the fourth element is the security key.

The inbound security association inSA includes four security associations. The first inbound security association is for packets sent from IP address ip3 to IP address ip1. This security association has the identifier of security parameter index SP10 and uses security key key10. The second security association is from IP address ip3 to IP address ip2. The second security association has the identifier of security parameter index SP20 and uses security key key20. Similarly, the third set of security associations is between IP address ip4 and IP address ip1 and the fourth security association is between IP address ip4 and IP address ip2. The third security association has the identifier of security parameter index SP30 and uses security key key30. The fourth security association has the identifier of security parameter index SP40 and uses security key key20. The four security associations each include a respective security parameter index and security key, and other information required for decrypting a packet.

The outbound security associations represent the four outbound paths of (ip1, ip3), (ip1, ip4), (ip2, ip3), and (ip2, ip4). The four security associations include the security parameter indices SPI50, SPI60, SPI70 and SPI8, respectively; the security keys key50, key60, key70, and key80, respectively; and other information required for encrypting a packet. Having different security keys in this way may advantageously limit the amount of data sent over paths 110-1-110-4 with the same security key. For example, there is less data for man-in-the-middle attack to intercept.

FIG. 9 depicts an example table 900 that may include inbound security associations and example table 904 that may include outbound security associations, in accordance with various embodiments. The inbound security associations and the outbound security associations may be included in a single table, or the inbound security associations or the outbound security associations may be in (multiple) different tables.

The inbound security associations for router 102-1 may be summarized a shown in table 900 at 902. Other inbound security associations for receiving packets from other routers may additionally or alternatively be included. Each inbound security association lists the sender address, destination address, a security parameter identifier, and a key.

The outbound security associations for router 102-1 may be summarized as shown in table 904 at 906. Other outbound security associations for receiving packets from other routers may additionally or alternatively be included. Each outbound security association may list the sender address, destination address, a security parameter identifier, and a key Although table 900 and table 904 show a different security key for each inSA and outSA, various combinations and permutations of the same security keys (e.g., as illustrated in table 300 and 304) and different security keys (e.g., as illustrated in table 900 and 904) may be used among the inSAs and outSAs. The look up of an applicable security association may be based on the parameters found in a packet. For example, router 102-1 uses tuple of the source IP address, destination IP address, security parameter index to look up the security key from table 900 or table 904.

What is claimed is:

1. A non-transitory computer-readable storage medium having embodied thereon a program, the program being executable by a processor to perform a method comprising:
identifying, by an agent of a first networking device, a plurality of data paths between the first networking device and a second networking device, wherein a given data path connects an interface of the first networking device with an interface of the second networking device, each interface being uniquely identified by an associated Internet Protocol (IP) address;
establishing, by the agent, a secure connection, wherein establishing the secure connection includes:
establishing a connection between the first and second networking devices using a first IP address of the first networking device and a second IP address of the second networking device;
negotiating security keys to establish the secure connection, the security keys including encryption keys and decryption keys;
generating an inbound security association and an outbound security association for each of the plurality of data paths, a given inbound security association including IP addresses associated with the given data path and a respective decryption key of the decryption keys, a given outbound security association including IP addresses associated with the given data path and a respective encryption key of the encryption keys; and
installing the inbound security association and outbound security association of each of the plurality of data paths in a data plane of the first networking device.

2. The non-transitory computer-readable storage medium of claim 1, wherein a given inbound security association decrypts one or more packets that are received by the first networking device from the second networking device in a given path, wherein a given outbound security association encrypts one or more packets that are sent by the first networking device to the second networking device in the given path.

3. The non-transitory computer-readable storage medium of claim 1, wherein the first IP address is a first virtual IP address, and the second IP address is a second virtual IP address.

4. The non-transitory computer-readable storage medium of claim 1, wherein when one of the plurality of data paths becomes unoperational, renegotiation of the security keys is not needed when at least one of the plurality of data paths is operational.

5. A method comprising:
receiving, by a computing device, address information for two or more paths between a first networking device and a second networking device;
establishing, by the computing device, a connection between the first networking device and the second networking device to determine security keys for the first networking device and the second networking device; and
installing, by the computing device, the security keys with the address information for the two or more paths, wherein for each path of the two or more paths between the first networking device and the second networking device a respective security key of the security keys is used to provide a security service on one or more packets that are sent or received using the address information for each path.

6. The method of claim 5, wherein receiving the address information for two or more paths between the first networking device and the second networking device comprises:
receiving a first set of addresses for a first set of interfaces on the first networking device and a second set of addresses for a second set of interfaces on the second networking device; and
generating the two or more paths based on connections between the first set of addresses for the first set of interfaces and the second set of addresses for the second set of interfaces.

7. The method of claim 5, wherein when one of the two or more paths becomes unoperational, renegotiation of the security keys is not needed when another of the two or more paths is operational.

8. The method of claim 5, wherein:
the two or more paths are between a first set of addresses for the first networking device and a second set of addresses for the second networking device, and
a third set of addresses that are not part of the two or more paths are used to determine the security keys.

9. The method of claim 8, wherein:
when determining new security keys, using the third set of addresses to determine the new security keys for the first networking device and the second networking device.

10. The method of claim 8, wherein:
the third set of addresses are private addresses,
the third set of addresses are changed to a fourth set of addresses, wherein the fourth set of addresses are used to establish the connection, and
the second networking device converts the fourth set of addresses to the third set of addresses to determine security keys for the first networking device and the second networking device.

11. The method of claim 8, wherein:
the first set of addresses are interfaces on the first networking device that are used to send or receive a packet in the one or more packets in the two or more paths,
the second set of addresses are interfaces on the second networking device that are used to send or receive a packet in the one or more packets in the two or more paths, and
the third set of addresses are interfaces for the first networking device and the second networking device that are not used to send or receive a packet in the one or more packets in the two or more paths.

12. A networking device comprising:
a processor; and
a memory communicatively coupled to the processor, the processor storing instructions executable by the memory to perform a method, the method comprising:
receiving address information for two or more paths between the networking device and a second networking device,
wherein the networking device is a first networking device;
establishing a connection between the first networking device and the second networking device to determine security keys for the first networking device and the second networking device; and
installing, the security keys with the address information for the two or more paths, wherein for each path of the two or more paths between the first networking device and the second networking device a respective security key of the security keys is used to provide a security service on one or more packets that are sent or received between the first networking device and the second networking device using the address information for each path.

13. The networking device of claim 12, wherein installing the security keys with the address information for the two or more paths comprises:
generating first security information for an outbound direction using the security keys, and
generating second security information for an inbound direction using the security keys.

14. The networking device of claim 13, wherein:
the security keys comprises a first security key for encrypting the one or more packets and a second security key for decrypting the one or more packets,
generating the first security information comprises:
generating one or more first inbound security associations for a first path using the first security key, and
generating one or more second inbound security associations for a second path using the first security key, and
generating the second security information comprises:
generating one or more first outbound security associations for the first path using the second security key, and
generating one or more second outbound security associations for the second path using the second security key.

15. The networking device of claim 14, wherein:
the one or more first inbound security associations comprise a first address for the first networking device, a third address for the second networking device, and the first security key,
the one or more first outbound security associations comprise the first address for the first networking device, the third address for the second networking device, and the second security key,
the one or more second inbound security associations comprise a second address for the first networking device, a fourth address for the second networking device, and the first security key, and
the one or more second outbound security associations comprise the second address for the first networking device, the fourth address for the second networking device, and the second security key.

16. The networking device of claim 15, wherein:
the first address is for a first interface for the first networking device and the second address is for a second interface for the first networking device, and
the third address is for a third interface for the second networking device and the fourth address is for a fourth interface for the second networking device, wherein the first interface, the second interface, the third interface, and the fourth interface are used to communicate the one or more packets in the two or more paths.

17. The networking device of claim 16, wherein:
the security keys comprise a first security key for encrypting the one or more packets and a second security key for decrypting the one or more packets,
generating the first security information comprises:
generating first inbound security information for a first path using the first security key, and
generating second inbound security information for a second path using the first security key, and
generating the second security information comprises:
generating first outbound security information for the first path using the first security key, and
generating second outbound security information for the second path using the second security key.

18. The networking device of claim 12, wherein establishing the connection between the first networking device and the second networking device to determine the security keys for the first networking device and the second networking device comprises:
using virtual addresses for the first networking device and the second networking device that are not used in a data plane to route packets in the two or more paths.

19. The networking device of claim 12, further comprising:
counting a number of counted packets sent on the two or more paths, and
upon determining that new security keys are required based on the number of counted packets, establishing another connection between the first networking device and the second networking device to determine the new security keys for the first networking device and the second networking device.

20. The networking device of claim 12, further comprising:
maintaining a replay window for the two or more paths, and
incrementing sequence numbers for packets sent on the two or more paths.

* * * * *